(12) United States Patent
Marvit et al.

(10) Patent No.: US 9,946,795 B2
(45) Date of Patent: Apr. 17, 2018

(54) USER MODELING WITH SALIENCE

(71) Applicant: FUJITSU LIMITED, Kawasaki-shi, Kanagawa (JP)

(72) Inventors: David L. Marvit, San Francisco, CA (US); Jeffrey Ubois, Chicago, IL (US)

(73) Assignee: FUJITSU LIMITED, Kawasaki (JP)

( * ) Notice: Subject to any disclaimer, the term of this patent is extended or adjusted under 35 U.S.C. 154(b) by 537 days.

(21) Appl. No.: 14/165,347

(22) Filed: Jan. 27, 2014

(65) Prior Publication Data

US 2015/0213020 A1 Jul. 30, 2015

(51) Int. Cl.
*G06F 17/30* (2006.01)

(52) U.S. Cl.
CPC .. *G06F 17/30867* (2013.01); *G06F 17/30011* (2013.01); *G06F 17/30598* (2013.01)

(58) Field of Classification Search
CPC ........ G06F 17/30011; G06F 17/30598; G06F 17/30867
USPC ................................................ 707/748, 769
See application file for complete search history.

(56) References Cited

U.S. PATENT DOCUMENTS

| 6,938,025 | B1 | 8/2005 | Lulich et al. |
| 7,400,761 | B2 | 7/2008 | Ma et al. |
| 7,593,013 | B2 | 9/2009 | Agutter et al. |
| 7,922,670 | B2 | 4/2011 | Jones et al. |
| 8,005,643 | B2 | 8/2011 | Tunkelang et al. |
| 8,343,067 | B2 | 1/2013 | Jones et al. |
| 8,364,660 | B2 | 1/2013 | Delgo et al. |
| 8,374,492 | B2 | 2/2013 | Le Meur et al. |
| 8,385,654 | B2 | 2/2013 | Gu et al. |
| 8,396,282 | B1 | 3/2013 | Huber et al. |
| 8,401,292 | B2 | 3/2013 | Park et al. |
| 2006/0026152 | A1* | 2/2006 | Zeng ................. G06F 17/30864 |
| 2009/0062629 | A1* | 3/2009 | Pradeep ............... A61B 5/0402 600/301 |
| 2009/0063255 | A1* | 3/2009 | Pradeep ................. G06Q 30/02 705/7.29 |
| 2009/0063256 | A1* | 3/2009 | Pradeep ................. G06Q 30/02 705/7.32 |
| 2011/0046502 | A1* | 2/2011 | Pradeep ............. A61B 5/04842 600/544 |
| 2011/0105937 | A1* | 5/2011 | Pradeep ............... A61B 5/0484 600/544 |
| 2011/0106621 | A1* | 5/2011 | Pradeep ................. G06Q 30/02 705/14.52 |

(Continued)

FOREIGN PATENT DOCUMENTS

WO 2008/109771 A2 12/2008

OTHER PUBLICATIONS

"A Bayesian model for efficient visual search and recognition", Elazary et al., Vision Research, 2010, pp. 1338-1352.

(Continued)

*Primary Examiner* — Joshua Bullock
(74) *Attorney, Agent, or Firm* — Maschoff Brennan

(57) ABSTRACT

A method of using a user model with salience includes providing content to a user through a user interface. The method also includes receiving physiological data corresponding to a physiological response of the user as the user interacts with the content. The method may also include determining a salience score for the content based at least in part on the physiological response of the user, and updating a user model with the salience score.

20 Claims, 10 Drawing Sheets

(56) References Cited

U.S. PATENT DOCUMENTS

| | | | |
|---|---|---|---|
| 2011/0196859 A1 | 8/2011 | Mei et al. | |
| 2011/0229025 A1 | 9/2011 | Zhao et al. | |
| 2011/0270620 A1* | 11/2011 | Pradeep | G06Q 30/02 |
| | | | 705/1.1 |
| 2012/0072289 A1* | 3/2012 | Pradeep | G06Q 99/00 |
| | | | 705/14.66 |
| 2012/0117112 A1 | 5/2012 | Johnston et al. | |
| 2012/0242900 A1 | 9/2012 | Huang et al. | |
| 2012/0275701 A1 | 11/2012 | Park et al. | |
| 2012/0288189 A1 | 11/2012 | Hu et al. | |
| 2013/0041866 A1 | 2/2013 | Simske et al. | |
| 2014/0106710 A1* | 4/2014 | Rodriguez | H04M 1/7253 |
| | | | 455/411 |

OTHER PUBLICATIONS

"Feature combination strategies for saliency-based visual attention systems", Itti et al., Journal of Electronic Imaging 10(1), Jan. 2001, pp. 161-169.

"Using Salience to Rank Documents", Grudziecka et al., Journal of Artificial Intelligence Research, CiteSeer, Apr. 2004.

"Salience-based Content Characterisation of Text Documents", Boguraev et al., Advances in Automatic Text Summarization, Jul. 1997, pp. 2-9.

"Contextual salience in query-based summarization", Bosma, International Conference RANLP, 2009, pp. 39-44.

"Salient Object Detection: A Benchmark", Borji et al., Department of Computer Science, University of Southern California, 2012, pp. 414-429.

\* cited by examiner

USER MODELING WITH SALIENCE

FIELD

The embodiments discussed herein are related to user modeling with salience.

BACKGROUND

The information age has brought an ocean of information that is difficult to organize, filter, rank and/or retrieve. There are many different systems that organize large data sets. For instance, search engines organize webpages using a number of different algorithms and may return content based on the popularity of the content and the search term(s) provided by the user. Some systems organize content based on semantic processing that focuses on the interrelationship of words within or between documents. And yet other systems organize content based on the popularity of words within the content. There are many other systems that use a number of techniques to organize, rank, and/or retrieve data.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system includes at least a user interface configured to present content to a user, a physiological sensor, and/or a controller. The physiological sensor may record a physiological response of the user over time as the user interacts with the content. The controller may provide the content to the user interface for presentation to the user, associate the physiological response of the user with the content as the user interacts with the content, determine a salience score for the content based at least in part on the physiological response of the user, and update a user model with the salience score.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

There are many systems that rank, filter, or cluster documents based on the content of the documents. Search engines are a good example. These systems, however, do not associate the salience and/or focus of users viewing the content in the documents in the filtering, ranking, or clustering of documents. The various embodiments described herein, among other things, may include systems and methods that associate salience with documents and use the salience data for ranking, filtering, and/or clustering of documents.

The salience of an item is the state or quality by which it stands out relative to its neighbors. Generally speaking, salience detection may be an attentional mechanism that facilitates learning and survival by enabling organisms to focus their limited perceptual and cognitive resources on the most pertinent subset of the available sensory data. Salience may also indicate the state or quality of content relative to other content based on a user's subjective interests in the content. Salience in document organization may enable organization based on how pertinent the document is to the user and/or how interested the user is in content found within the document.

The focus of a user on content may be related to salience. Focus may include the amount of time the user spends viewing content relative to other content as well as the physiological or emotional response of the user to the content.

Salience and/or focus may be measured indirectly. For instance, the salience may be measured at least in part by using devices that relate to a user's physiological and/or emotional response to the content, for example, those devices described below. The salience and/or focus may relate to how much or how little the user cares about or is interested in what they are looking at. Such data, in conjunction with eye tracking data and/or keyword data, may suggest the relative importance or value of the content to the user. The focus may similarly be measured based in part on the user's physiological and/or emotional response and in part by the amount of time the user views the content using, for example, eye tracking data. A salience score may represent a numerical number that is a function of physiological data recorded from one or more physiological sensors and/or eye tracking data recorded from an eye tracking subsystem.

Embodiments of the present invention will be explained with reference to the accompanying drawings.

Figure 1:
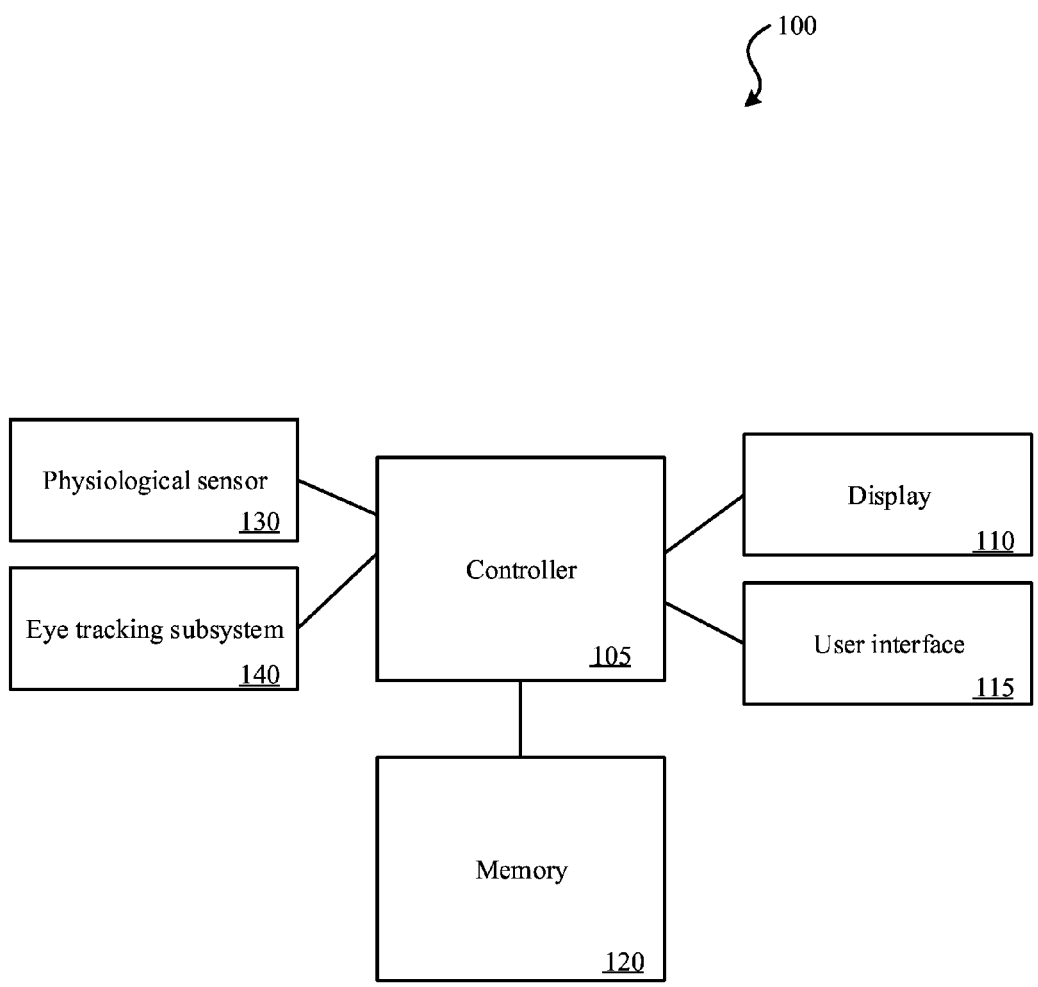
FIG. 1 is a block diagram of an example system for associating eye tracking data and physiological data with content in a document according to at least one embodiment described herein.

FIG. 1 is a block diagram of an example system 100 for associating eye tracking data and physiological data with content in a document in accordance with at least one embodiment described herein. The system 100 may include a controller 105, a display 110, a user interface 115, and a memory 120, which may, in at least one embodiment described herein, be part of a standalone or off-the-shelf computing system. The system 100 may include various other components without limitation. The system 100 may also include an eye tracking subsystem 140 and/or a physiological sensor 130. In at least one embodiment described herein, the physiological sensor 130 may record brain activity data, for example, using an EEG system. In at least one embodiment described herein, a physiological sensor other than an EEG system may be used.

In at least one embodiment described herein, the controller 105 may be electrically coupled with and control the operation of each component of the system 100. For instance, the controller 105 may execute a program that displays a document stored in the memory 120 on the display 110 and/or through speakers or another output device in response to input from a user through the user interface 115. The controller 105 may also receive input from the physiological sensor 130, and the eye tracking subsystem 140.

As described in more detail below, the controller 105 may execute a process that associates inputs from one or more of an EEG system, the eye tracking subsystem 140, and/or other physiological sensors 130 with content within a document displayed in the display 110 and may save such data in the memory 120. Such data may be converted and/or saved as salience and/or focus data (or scores) in the memory 120. The controller 105 may alternately or additionally execute or control the execution of one or more other processes described herein.

The physiological sensor 130 may include, for example, a device that performs functional magnetic resonance imaging (fMRI), positron emission tomography, magnetoencephalography, nuclear magnetic resonance spectroscopy, electrocorticography, single-photon emission computed tomography, near-infrared spectroscopy (NIRS), Galvanic Skin Response (GSR), Electrocardiograms (EKG), pupillary dilation, Electrooculography (EOG), facial emotion encoding, reaction times, and/or event-related optical signals. The physiological sensor 130 may also include a heart rate monitor, galvanic skin response (GSR) monitor, pupil dilation tracker, thermal monitor or respiration monitor.

Figure 2:
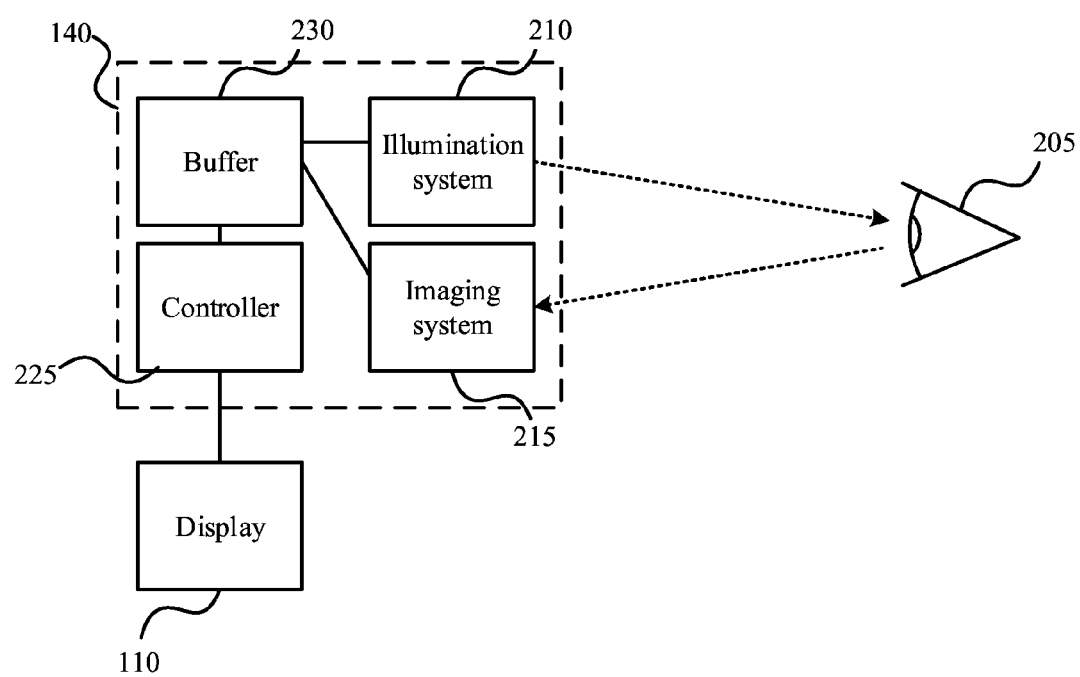
FIG. 2 is a block diagram of an example eye tracking subsystem according to at least one embodiment described herein.

FIG. 2 is a block diagram of an example embodiment of the eye tracking subsystem 140 according to at least one embodiment described herein. The eye tracking subsystem 140 may measure the point of gaze (where one is looking) of the eye 205 and/or the motion of the eye 205 relative to the head. In at least one embodiment described herein, the eye tracking subsystem 140 may also be used in conjunction with the display 110 to track either the point of gaze or the motion of the eye 205 relative to information displayed on the display 110. The eye 205 in FIG. 2 may represent both eyes and eye tracking subsystem may perform the same function on one or both eyes.

The eye tracking subsystem 140 may include an illumination system 210, an imaging system 215, a buffer 230, and a controller 225. The controller 225 may control the operation and/or function of the buffer 230, the imaging system 215, and/or the illumination system 210. The controller 225 may be the same controller as the controller 105 or a separate controller. The illumination system 210 may include one or more light sources of any type that direct light, for example, infrared light, toward the eye 205. Light reflected from the eye 205 may be recorded by the imaging system 215 and stored in the buffer 230. The imaging system 215 may include one or more imagers of any type. The data recorded by the imaging system 215 and/or stored in the buffer 230 may be analyzed by the controller 225 to extract, for example, eye rotation data from changes in the reflection of light off the eye 205. In at least one embodiment described herein, corneal reflection (often called the first Purkinje image) and the center of the pupil may be tracked over time. In other embodiments, reflections from the front of the cornea (the first Purkinje image) and the back of the lens (often called the fourth Purkinje image) may be tracked over time. In other embodiments, features from inside the eye may be tracked such as, for example, the retinal blood vessels. In yet other embodiments, eye tracking techniques may use the first Purkinje image, the second Purkinje image, the third Purkinje image, and/or the fourth Purkinje image singularly or in any combination to track the eye. In at least one embodiment described herein, the controller 225 may be an external controller.

In at least one embodiment described herein, the eye tracking subsystem 140 may be coupled with the display 110. The eye tracking subsystem 140 may also analyze the data recorded by the imaging system 215 to determine the eye position relative to a document displayed on the display 110. In this way, the eye tracking subsystem 140 may determine the amount of time the eye viewed specific content items within a document on the display 110. In at least one embodiment described herein, the eye tracking subsystem 140 may be calibrated with the display 110 and/or the eye 205.

The eye tracking subsystem 140 may be calibrated in order to use viewing angle data to determine the portion (or content items) of a document viewed by a user over time. The eye tracking subsystem 140 may return view angle data that may be converted into locations on the display 110 that the user is viewing. This conversion may be performed using calibration data that associates viewing angle with positions on the display.

Figure 3:
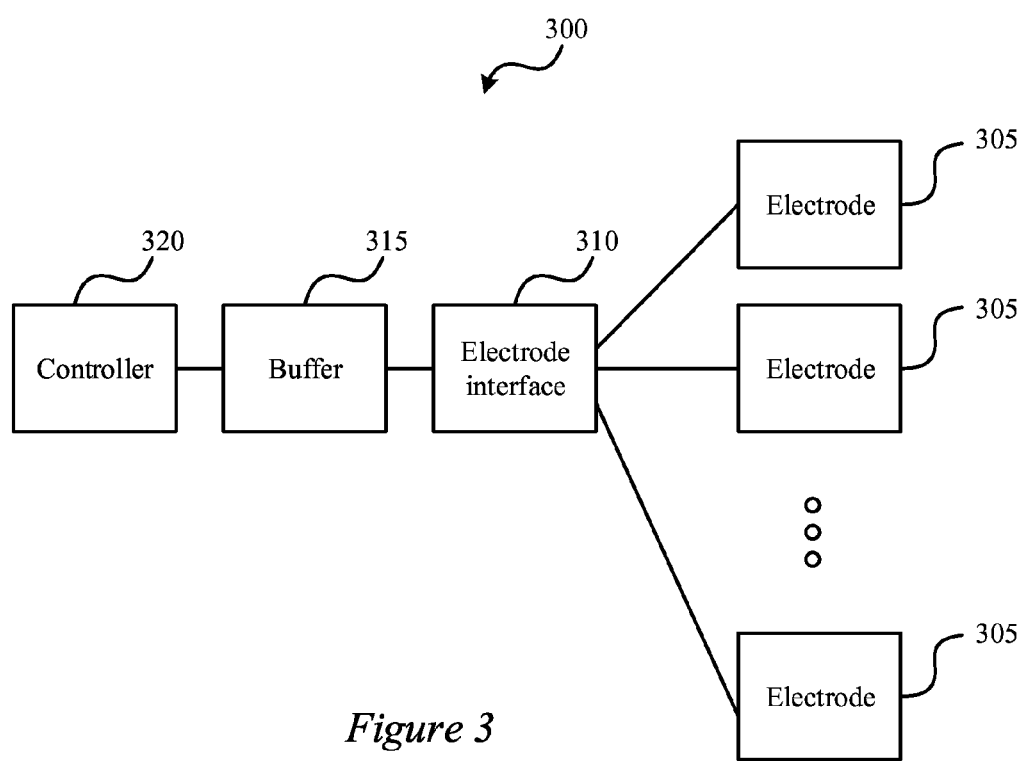
FIG. 3 is a block diagram of an example electroencephalography (EEG) system according to at least one embodiment described herein.

FIG. 3 is a block diagram of an example embodiment of an EEG system 300 according to at least one embodiment described herein. The EEG system 300 is one example of a physiological sensor 130 that may be used in various embodiments described herein. The EEG system 300 may measure voltage fluctuations resulting from ionic current flows within the neurons of the brain. Such information may be correlated with how focused and/or attentive the individual is when viewing a document or a portion of the document being viewed while EEG data is being collected. This information may be used to determine the focus and/or salience of the document or a portion of the document. The data collected from the EEG system 300 may include either or both the brain's spontaneous electrical activity or the spectral content of the activity. The spontaneous electrical activity may be recorded over a short period of time using multiple electrodes placed on or near the scalp. The spectral content of the activity may include the type of neural oscillations that may be observed in the EEG signals. While FIG. 3 depicts one type of EEG system, any type of system that measures brain activity may be used.

The EEG system 300 may include a plurality of electrodes 305 that are configured to be positioned on the scalp of a user. The electrodes 305 may be coupled with a headset, hat, or cap (see, for example, FIG. 4) that positions the electrodes on the scalp of a user when in use. The electrodes 305 may be saline electrodes, post electrodes, gel electrodes, etc. The electrodes 305 may be coupled with a headset, hat, or cap following any number of arranged patterns such as, for example, the pattern described by the international 10-20 system standard for the electrodes 305 placements.

The electrodes 305 may be electrically coupled with an electrode interface 310. The electrode interface 310 may include any number of components that condition the various electrode signals. For example, the electrode interface 310 may include one or more amplifiers, analog-to-digital converters, filters, etc. coupled with each electrode. The electrode interface 310 may be coupled with buffer 315, which stores the electrode data. The controller 320 may access the data and/or may control the operation and/or function of the electrode interface 310, the electrodes 305, and/or the buffer 315. The controller 320 may be a stand-alone controller or the controller 105.

The EEG data recorded by The EEG system 300 may include EEG rhythmic activity, which may be used to determine a user's salience when consuming content with a document. For example, theta band EEG signals (4-7 Hz) and/or alpha band EEG signals (8-12 Hz) may indicate a drowsy, idle, relaxed user, and result in a low salience score for the user while consuming the content. On the other hand, beta EEG signals (13-30 Hz) may indicate an alert, busy, active, thinking, and/or concentrating user, and result in a high salience score for the user while consuming the content.

Figure 4:
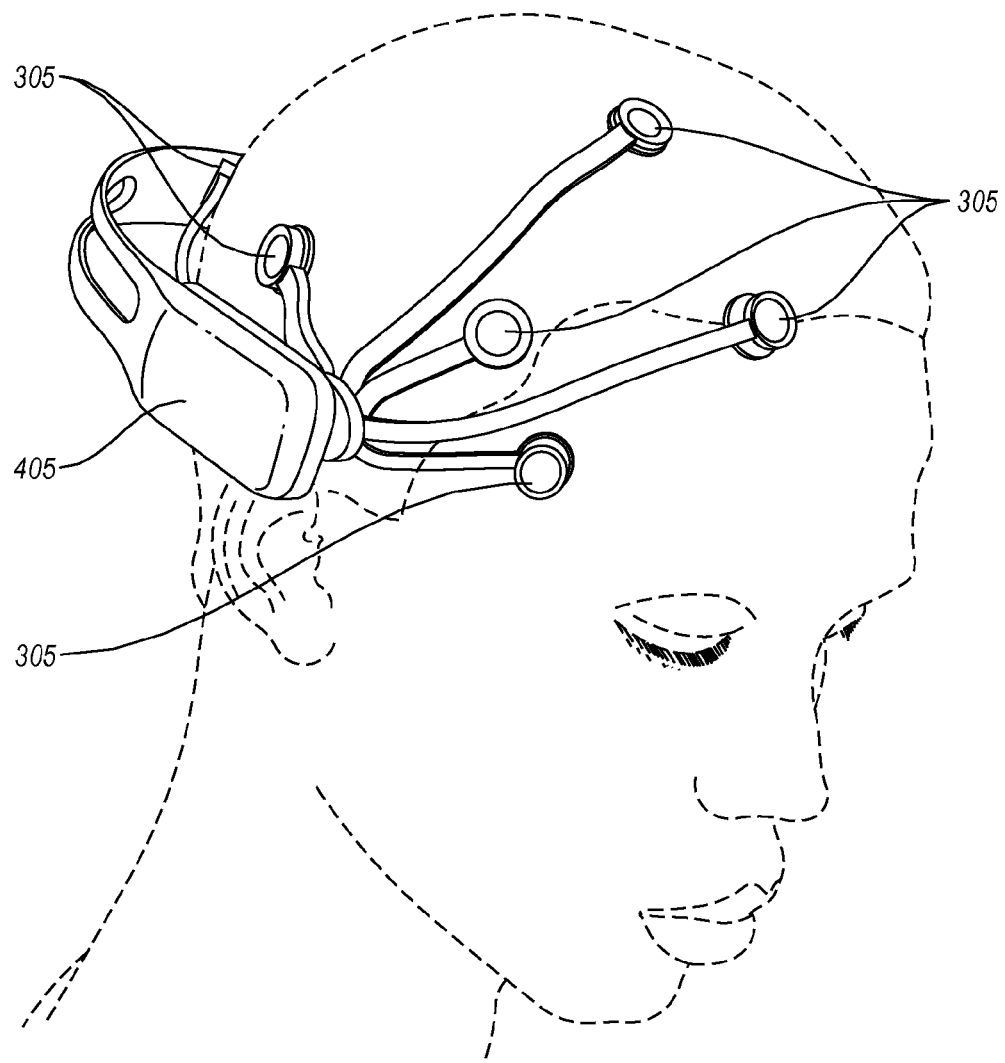
FIG. 4 illustrates an example EEG headset with a plurality of EEG sensors according to at least one embodiment described herein.

FIG. 4 illustrates an example EEG headset 405 with a number of Electrodes 305 according to at least one embodiment described herein. The Electrodes 305 may be positioned on the scalp using the EEG headset 405. Any number of configurations of the Electrodes 305 on the EEG headset 405 may be used.

Figure 5:
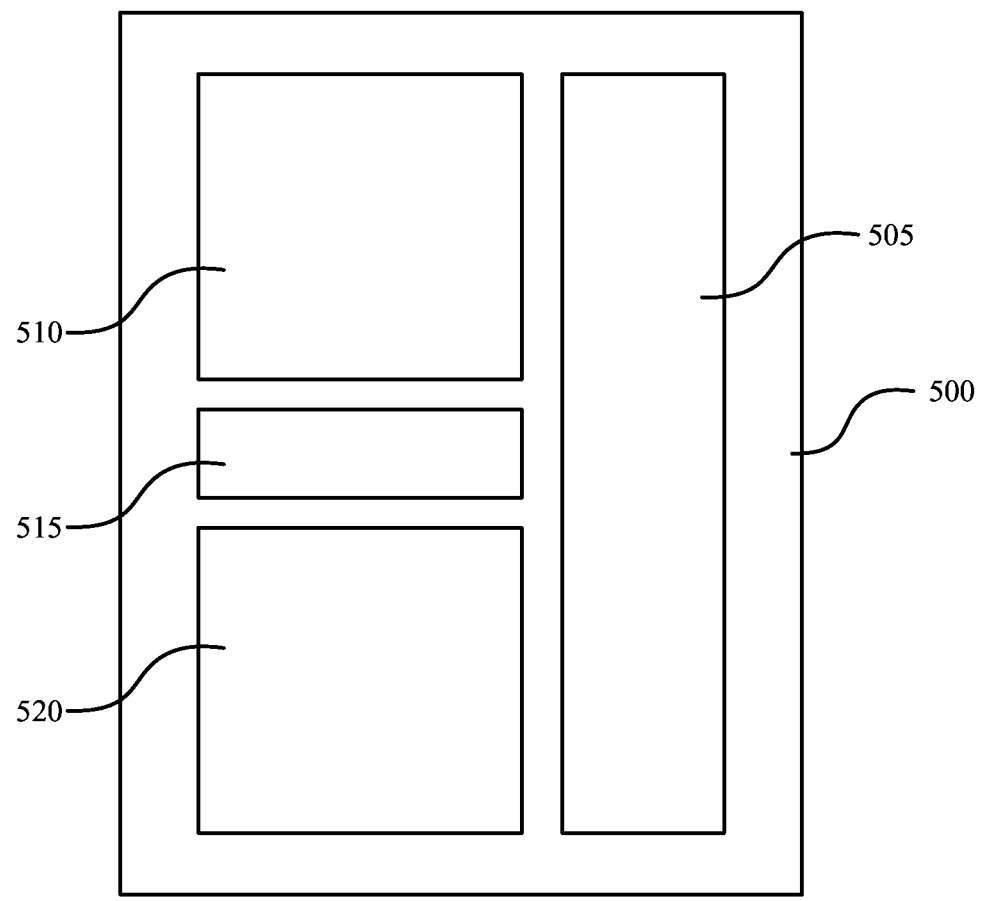
FIG. 5 illustrates an example document that may be viewed by a user through a display according to at least one embodiment described herein.

FIG. 5 illustrates an example document that may be consumed by a user through the display 110 and/or through speakers or another output device according to at least one embodiment described herein. In this example, the document 500 includes an advertisement 505, which may include text, animation, video, and/or images, a body of text 510, an image 515, and a video 520. Advertisement 505 and/or video 520 may be time-based content and may include audio. Various other content or content items may be included within documents 500.

The term "content item" refers to one of the advertisement 505, the text 510, the image 515, and the video 520; the term may also refer to other content that may be present in a document. The term "content item" may also refer to a single content item such as music, video, flash, text, a PowerPoint presentation, an animation, an HTML document, a podcast, a game, etc. Moreover, the term "content item" may also refer to a portion of a content item, for example, a paragraph in a document, a sentence in a paragraph, a phrase in a paragraph, a portion of an image, a portion of a video (e.g., a scene, a cut, or a shot), etc. Moreover, a content item may include sound, media or interactive material that may be provided to a user through a user interface that may include speakers, a keyboard, touch screen, gyroscopes, a mouse, heads-up display, instrumented "glasses", and/or a hand held controller, etc. The document 500 shall be used to describe various embodiments described herein.

Figure 6:
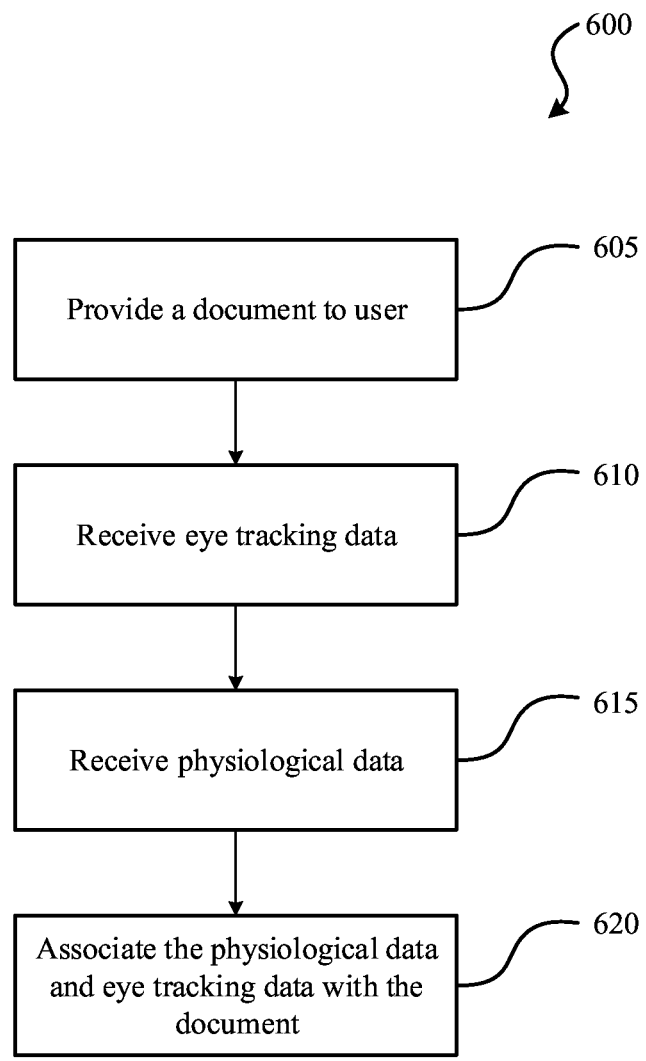
FIG. 6 is a flowchart of an example process for associating physiological data and eye tracking data with content in a document according to at least one embodiment described herein.

FIG. 6 is a flowchart of an example process 600 for associating physiological data and eye tracking data with content in document 500 according to at least one embodiment described herein. Process 600 begins at block 605. Document 500 may be provided to a user, for example, through the display 110 and/or user interface 115. At block 610 eye tracking data may be received from, for example, the eye tracking subsystem 140. Eye tracking data may include viewing angle data that includes a plurality of viewing angles of the user's eye over time as the user views portions of the content in document 500. The viewing angle data may be used to determine which specific portions of the display the user was viewing at a given time. This determination may be made based on calibration between the user, the display 110, and eye tracking subsystem 140. For example, viewing angle data may be converted to display coordinates. These display coordinates may identify specific content items based on such calibration data, the time, and details about the location of content items within document 500 being viewed.

At block 615 physiological data may be received. Block 610 and block 615 may occur in any order. The two blocks may also occur simultaneously. Physiological data may be received, for example, from the EEG system 300 as brain activity data recorded over time. Various additional or different physiological data may be received. The physiological data may be converted or normalized into salience data (and/or focus data). At block 620 the salience data and the eye tracking data may be associated with the content in document 500 based on the time the data was collected. Table 1, shown below, is an example of eye tracking data and salience data associated with the content in document 500.

TABLE 1

| Time (seconds) | Content | Average Salience Score |
|---|---|---|
| 10 | Advertisement 505 | 40 |
| 10 | Image 515 | 45 |
| 25 | Video 520 | 56 |
| 145 | Image 515 | 70 |
| 75 | Text 510 | 82 |
| 10 | Advertisement 505 | 52 |
| 230 | Image 515 | 74 |
| 135 | Text 510 | 88 |
| 10 | Video 520 | 34 |

The first column of Table 1 is an example of an amount of time a user spent viewing content items listed in the second column before moving to the next content item. Note that the user moves between content items and views some content items multiple times. As shown, summing the amount of time the user spends viewing specific content items; the user views the advertisement 505 for a total of 20 seconds, the text 510 for a total of 210 seconds, the image 515 for a total of 385 seconds, and the video 520 for a total of 35 seconds. Thus, the user spends most of the time viewing the image 515. This data is useful in describing how long the user is looking at the content, but does not reflect how interested, salient, or focused the user is when viewing the content in document 500.

The third column lists the average salience score of the content. In this example, the salience score is normalized so that a salience score of one hundred represents high salience and/or focus and a salience score of zero represents little salience and/or focus. The salience score listed in Table 1 is the average salience score over the time the user was viewing the listed content item. The average salience score for both times the user viewed the advertisement 505 is 46, the average salience score for the text 510 is 85, the average salience score for the image 515 is 63, and the average salience score for the video 520 is 45. Thus, in this example, the text 510 has the highest salience even though the user viewed the text 510 for the second longest period of time, and the image 515 has the second highest salience score even though it was viewed the longest period of time.

As shown in Table 1, process 600 may associate specific content items of document 500 with salience data using the eye tracking data. Furthermore, process 600 may also associate specific content with the amount of time the content was viewed by the user. The salience data and the time data associated with the content may be used in a number of ways. For example, metadata may be stored with document 500 or as a separate metadata file that tags the specific content with either or both the salience data and/or the time the content was viewed. This metadata may also associate keywords or other semantic or statistical information with the content in document 500.

Process 600 may be used, for example, to tag the content in document 500 with eye tracking data and/or salience data. For example, content 505 may be tagged with a salience score of 46, the text 510 may be tagged with a salience score of 85, the image 515 may be tagged with a salience score of 63, and the video 520 may be tagged with a salience score of 45. In at least one embodiment described herein, the content may also be tagged with the amount of time the user views each content item or the percentage of time the user views each content item relative to the amount of time the user views document 500. In at least one embodiment described herein, the content may be tagged with a score that is a combination of the salience and the time the user viewed the content. The content may be tagged in a separate database or file, or embedded with the document 500.

Furthermore, the process 600 may be repeated with any number of documents. For instance, each of these documents may be provided to the user and associated with eye tracking data and/or physiological data as the user views each document, which may then be stored in a database.

Figure 7:
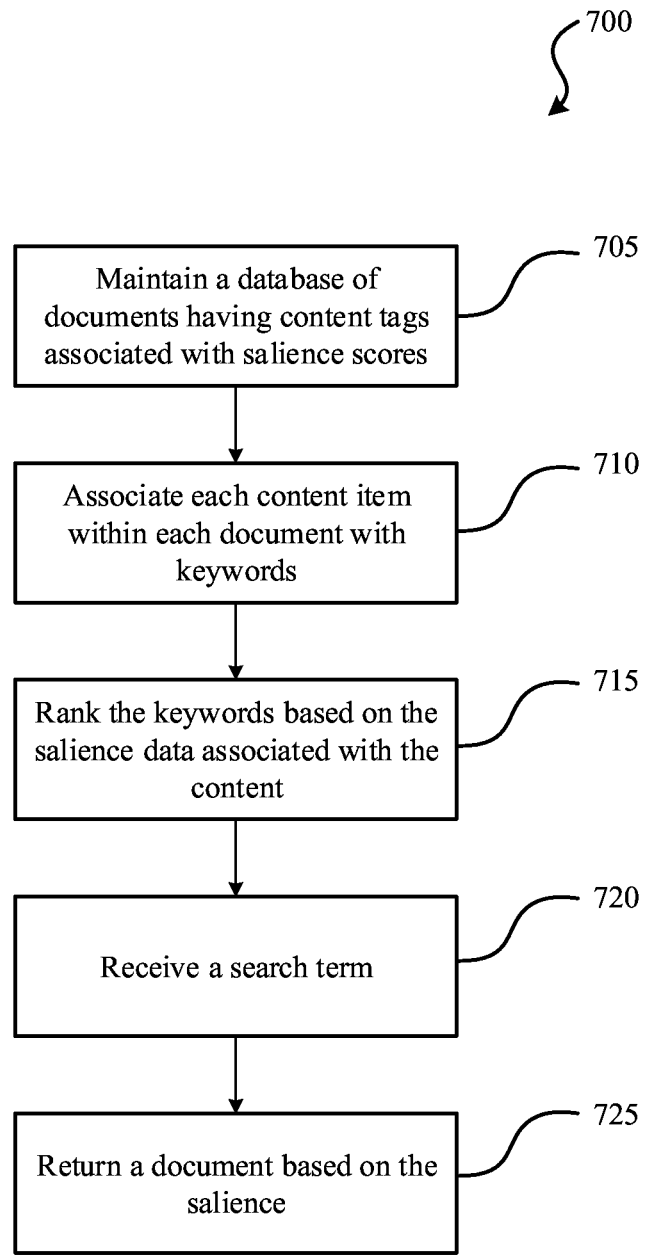
FIG. 7 is a flowchart of an example process for using collected salience scores to search for relevant documents according to at least one embodiment described herein.

FIG. 7 is a flowchart of an example process 700 for using collected salience scores to search for relevant documents according to at least one embodiment described herein. The process 700 begins at block 705 where a database of documents having the content tagged with salience scores may be maintained in memory or any other type of data storage such as, for example, cloud storage. Each of the documents, for example, may have been tagged with salience scores using the process 600. In at least one embodiment described herein, each document may be tagged using the process 600 multiple times for multiple users. Then the salience data may be averaged over users.

At block 710, keywords may be associated with each content item within the document using any type of keyword generation and/or indexing technique. A keyword may include, for example, a word, a phrase, an identifier, a tag, a source, a rank, a number, a distribution, a URL, etc. Keywords may be assigned to content items using any number of techniques such as, for example, semantic indexing, statistical techniques, natural language indexing, keyword optimization techniques, latent semantic indexing, content type indexing, subject matter indexing, document parsing, natural language processing, etc. The content may also be labeled based on the type of content such as text, video, image, advertisement, games, poll, flash, etc. For example, the metadata may identify the advertisement 505 as an advertisement, the text 510 as text, the image 515 as an image, and/or the video 520 as a video. Some content such as advertisements, flash, etc. may include different types of content. Such content may be labeled with one or more content type identifiers. Keywords from the text 510 may be used, which represent the various concepts described as text. For example, a content item may also be identified (or tagged) with an origin that may be used as a keyword. For example, document 500 may be a web page and each content item may be associated with different URLs indicating the origin or the network location of the content item. Tracking these may prove useful for a variety of purposes such as, for example, filtering or filtering down the line.

The keywords from the various different content items 505, 510, 515, and 520 within the document 500 may be consolidated to form keywords for the document 500. At block 715, the keywords may be ranked or weighted based on the salience data associated with the content.

For example, the advertisement 505 may be associated with keywords: rafting, family sightseeing, and Idaho. In the document these keywords may be ranked based on the advertisement 505's salience score of 46. The text 510 may be associated with the following keywords: kayak, whitewater, paddling, and Colorado River. In the document these keywords may be ranked based on the text 510's salience score of 85. The image 515 may be associated with keywords: image, whitewater, and Payette River. In the document these keywords may be ranked based on the image 515's salience score of 63. The video 520 may be associated with keywords: video, paddling safety, American Whitewater, and personal floatation device. In the document these keywords may be ranked based on the video 520's salience score of 45. In this example, the document 500 includes keywords in the following ranked order: kayak, whitewater, paddling, Colorado River, image, whitewater, Payette River, rafting, family sightseeing, Idaho, video, paddling safety, American Whitewater, and personal floatation device.

As another example, the keywords associated with each content item may also be ranked based on the relevance of the keywords to the content. Table 2 illustrates how the content keyword scores may be combined with the salience scores of each content item in the document 500 to produce a combined score. The first column lists the keywords associated with each content item listed in column 2. The content keyword score is listed in column three. The content keyword score is a normalized value (100 being the highest score and zero the lowest score) that depicts the relevance of the keyword listed in the first column with the content listed in the second column. Any number of techniques may be used to determine the content keyword score. The fourth column lists the overall average salience score of the content and the last column lists the combined score. In this example, the combined score is an average of the content keyword score and the salience score. Any other mathematical function that combines the content keyword score and the salience score may be used. The combined score may also be a function of the amount of time the user spent viewing the content. The combined score may weight either the content keyword score or the salience score more heavily, or the combined score may weight the content keyword score and the salience score equally. The combined score may incorporate other data known about the content item, the keywords, the user, the time(s) of document access, and/or the document. Process 700 may rank the keywords of all the documents in the database using the same technique, or using different techniques.

TABLE 2

| Keyword | Content | Content Keyword Score | Salience Score | Combined Score |
| --- | --- | --- | --- | --- |
| rafting | Ad 505 | 75 | 46 | 60.5 |
| family | Ad 505 | 28 | 46 | 37 |

TABLE 2-continued

| Keyword | Content | Content Keyword Score | Salience Score | Combined Score |
|---|---|---|---|---|
| sightseeing Idaho | Ad 505 | 42 | 46 | 44 |
| kayak | Text 510 | 65 | 85 | 75 |
| whitewater | Text 510 | 70 | 85 | 77.5 |
| paddling | Text 510 | 78 | 85 | 81.5 |
| Colorado River | Text 510 | 25 | 85 | 55 |
| image | Image 515 | 80 | 63 | 71.5 |
| whitewater | Image 515 | 80 | 63 | 71.5 |
| Payette River | Image 515 | 80 | 63 | 71.5 |
| video | Video 520 | 80 | 45 | 62.5 |
| paddling | Video 520 | 25 | 45 | 35 |
| safety | Video 520 | 85 | 45 | 65 |
| American Whitewater | Video 520 | 10 | 45 | 27.5 |
| personal floatation device | Video 520 | 15 | 45 | 30 |

At block 720, a search term may be received. The search term may then be used at block 725 to return a document or a set of documents based on the salience. For instance, if the search term provided at block 720 is "kayak," then the document 500 would likely be a relevant document based on the keywords in the document and the salience score because of the combined score of 75. Without the salience score the search term "kayak" would be less relevant because the keyword score is only 65. In this example, by adding the salience score, the search term becomes more or less relevant. Similarly, if the search term is "safety," then the document 500 will be less relevant based on the combined score because the salience score pulled the content keyword score down from 85 to a combined score of 45. These scores provided in this example are relevant to a search term in comparison with combined scores of other documents in the database. In this example, process 700 uses the salience of the content to return documents that not only have a keyword associated with a search term, but also return documents that the user is interested in based on the salience of the document. In this way a search may provide results that are user specific.

In accordance with at least one embodiment described herein, salience scores (or focus scores) may be used as part of a user model. A user model may represent a collection of personal data associated with a specific user and may be the basis for adaptive changes to a system's behavior. A user model, for example, may include personal information such as a user's name, age, interests, skills, search history, viewing history, likes, dislikes, knowledge, goals, demographics, user associations, purchase history, plans, appointments, calendar items, application-specific preferences, global preferences, social graph, behaviors, and/or interactions with systems, content, services, and/or resources, etc.

For example, a user model may record a user's movie viewing history and the user's rankings of previously viewed movies. The user model may then recommend another movie to the user based on the user model and the ranking of movies viewed by other users with similar user models. In this way, the user model may make a recommendation for another movie that the user has not seen and that the user will likely enjoy. Similarly, a user model may recommend music, books, articles, web pages, products to purchase, etc. based on the user's user model.

In at least one embodiment described herein, a user model with salience may be created based on salience and/or focus data recorded using, for example, physiological sensors, EEG devices, eye tracking devices, etc. The user model with salience may infer a user's interests in the content based on the salience scores of the user when interacting with the content. Because each user may have different interests, a user salience model may vary from user to user and may provide information about each user's interests in content. Moreover, because users may have different interests depending on what mode they are in, a user may create different user salience models depending on their mode. For instance, a user may have different user salience models related to their work interests, home interests, hobby interests, sport interests, etc. User salience models may also be created based on the time of day, day of the week, month of the year, or the year, location, health state, exercise activity, etc.

Figure 8:
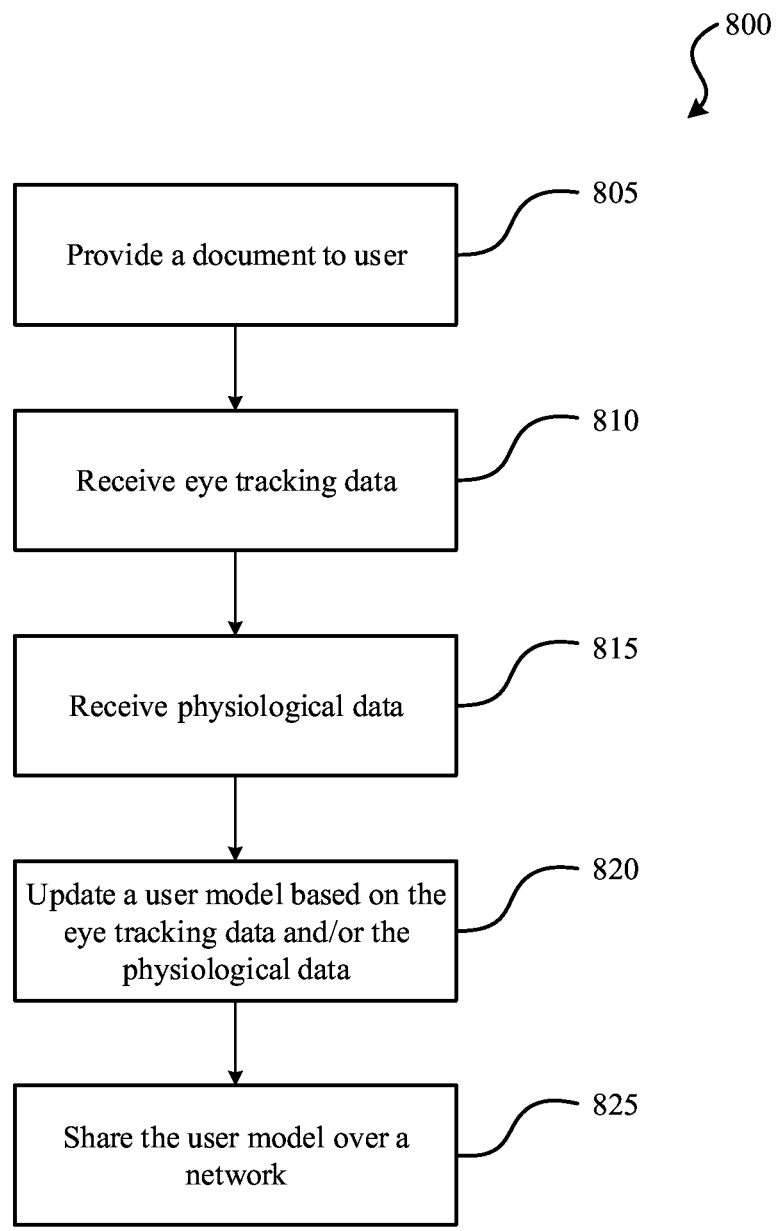
FIG. 8 is a flowchart of an example process for updating a user model with salience scores according to at least one embodiment described herein.

FIG. 8 is a flowchart of an example process 800 for updating a user model with salience scores according to at least one embodiment described herein. At block 805, which may be similar to block 605 of FIG. 6, the document 500 is provided to a user, for example, through the display 110 and/or the user interface 115. In at least one embodiment described herein, the document 500 may include as few as one of the four content items shown in the document. For example, a single video may be presented to the user through the display 110 and/or the user interface 115. Or a single song may be played through speakers. Moreover, in this embodiment, the content items in the document 500 may be assigned keywords.

At block 810, which may be similar to block 610 in FIG. 6, eye tracking data may be received from, for example, the eye tracking system 140. Eye tracking data may include viewing angle data that includes a plurality of viewing angles of the user's eye over time as the user views portions of the content in the document 500. The viewing angle data may be used to determine which specific portions of the display the user was viewing at a given time. This determination may be made based on calibration between the user, the display 110, and the eye tracking system 140. For example, viewing angle data may be converted to display coordinates. These display coordinates may identify specific content items based on the calibration data, the time, and details about the location of content items within the document being viewed.

At block 815, which may be similar to block 615 in FIG. 6, physiological data may be received. Physiological data may be received, for example, from the EEG system 300 as physiological data recorded over time. Various additional or different physiological data may be received as described above. The physiological data may be converted or normalized into salience scores (and/or focus scores).

At block 820, a user model may be updated with salience data and/or the eye tracking data. For example, the user model may be updated to include the salience score of the content or each content item. As another example, the user model may be updated to include the salience scores of keywords associated with the document 500 and/or the content items within the document 500. In at least one embodiment described herein, keywords, content items, or the document 500 with previous salience scores may have their salience scores modified based on the salience score of the keywords, document, and/or content items. The salience score of a keyword in the user model may be updated when new salience data is provided for content items associated with the same keyword. For example, the salience score of keywords in the user model may be weighted toward more recent salient scores over less recent salience scores.

As another example, the user model may list content items (e.g., movies or music) consumed by the user and the salience score of the content item when consumed by the user. The salience score of the content item may be updated when the user views the content item or views a related content item such as, for example, a content item by the same artist, the same producer, from the same genre, from the same category, etc.

As another example, the user model may list search terms that the user has used in the past and/or search terms that have been shown to produce documents that have been consumed by the user. The salience score of the search terms may be updated based on the salience scores of keywords in the document 500 and the salience scores of those keywords.

As yet another example, the user model may list advertisement keywords that have triggered advertisement conversion by the user in the past (e.g., the user clicks on a link within the advertisement and visits the webpage associated with the link). The salience score of advertisement keywords may be updated based on the salience scores of keywords in the document 500, the salience score of the document 500, or the salience scores of the content within the document 500. In this way advertisers may use the user model to provide advertisements based on salience scores, content, and/or keywords.

At block 825, the user model (or a portion of the user model) may be shared over a computer network. For example, the user model may be shared with a content host, a content aggregator, an advertiser, a broker, a developer, a contact, friend, social network, webpage, etc. In at least one embodiment described herein, the user model may be shared with multiple content hosts. In at least one embodiment described herein, some portions of the user model may be shared with one host and different portions of the user model may be shared with another host.

The user model may also be shared over the network with a recommender system. A recommender system may cluster or aggregate user models to predict ratings or preferences of users based on clustered or aggregated user models. In particular, a recommender system may use salience scores within the user model to predict ratings or predictions. For example, the recommender system may predict content that a user might like based on the user's salience scores and content viewing habits based on comparisons of aggregated content viewing habits and salience scores of other users.

In at least one embodiment described herein, the user model may be stored in the cloud. In such embodiments, a salience score that may be determined from the eye tracking data and/or the physiological data may be sent to a host along with keywords or an indication of the content item(s), which may then update the user model.

Figure 9:
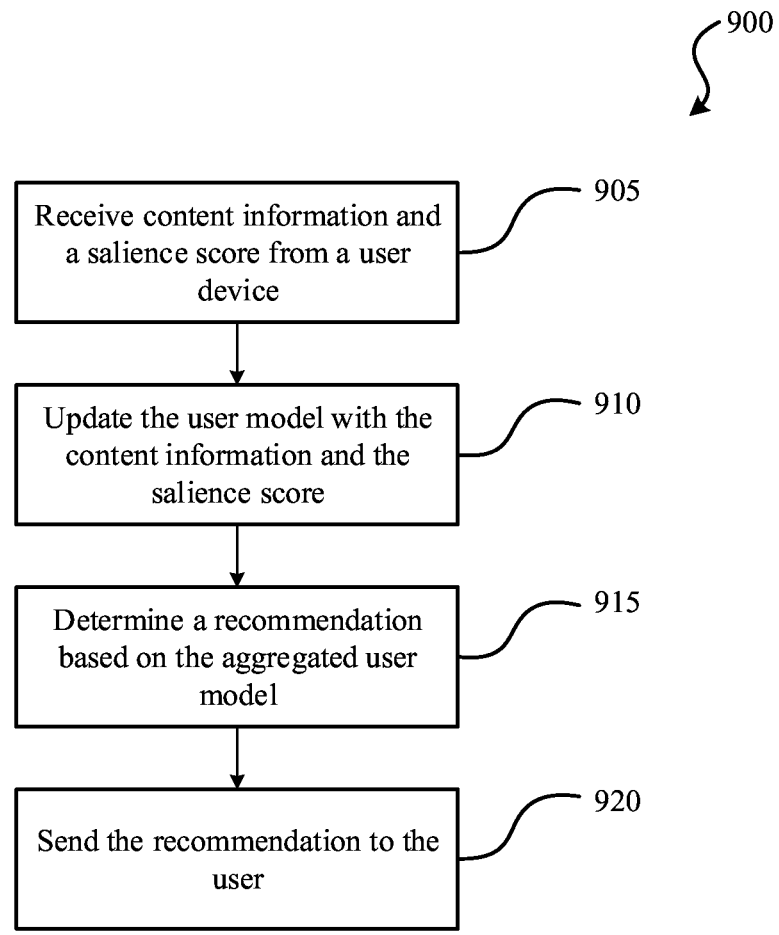
FIG. 9 is a flowchart of an example process for using aggregated salience data for content recommendations according to at least one embodiment described herein.

FIG. 9 is a flowchart of an example process 900 for using aggregated salience data for content recommendations according to at least one embodiment described herein. The process 900 may begin at block 905 where content information and a salience score are received at a recommender system, for example, through a network connection. The content information may include a link to the content, the name of the content, keywords associated with the content, etc. The user name or a user identifier may also be sent to the recommender system hosted by a server.

At block 910, a user model may be updated based on the content information and the salience score. The user model may be part of an aggregated user model that includes the user model from a number of different users. The aggregated user model may be stored in the cloud and/or maintained by a server. The aggregated user model may be used to make predictions of content that may produce a predicted salience response to a user based on the salience responses of other users when viewing similar or the same content. At block 915, recommended content may be determined based on the salience scores of content within the aggregated user model. The recommended content may include the name, title, author, URL, thumbnail, network location, a link, etc. of the recommended content. At block 920, the recommended content may be sent from the server to the user device through a network connection.

Figure 10:
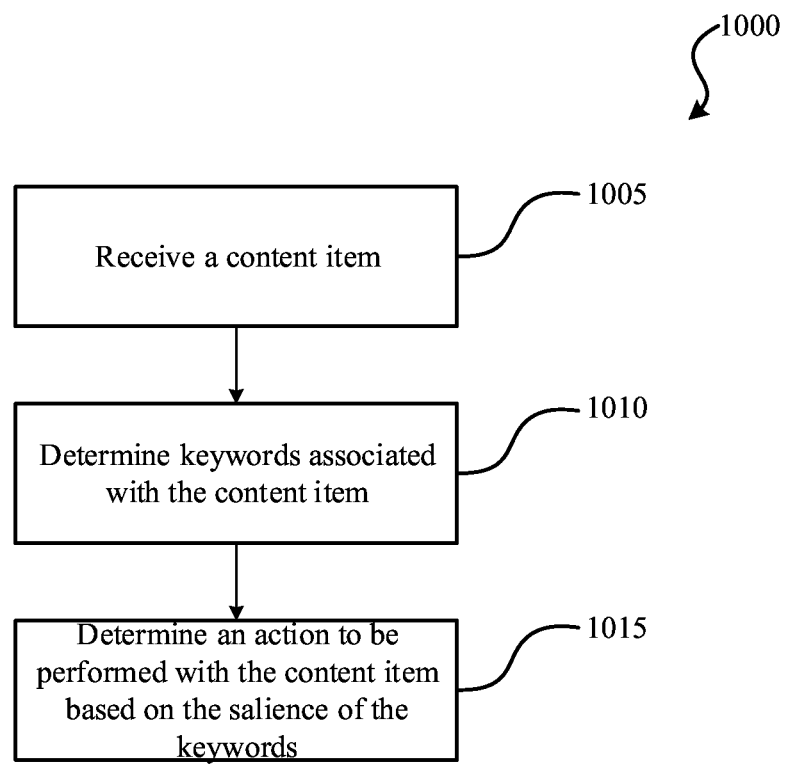
FIG. 10 is a flowchart of an example process for using a user model that includes salience to perform an action on a content item according to at least one embodiment described herein.

FIG. 10 is a flowchart of an example process 1000 for using a user model that includes salience to perform an action on a content item according to at least one embodiment described herein. At block 1005, a content item is received. The content item may include, for example, an e-mail, a tweet, a social network message, a text message, a push notification, invitation, etc. The content item may include text, images, videos, HTML, XML, flags, fields, maps, etc. For example, the content item may be an e-mail with the following fields: subject, body, to, from, carbon copy, blind carbon copy, etc. As another example, the content item may be a tweet from a user having a user name.

At block 1010 the keywords associated with the content item may be determined using any process described herein, or more generally any process now known or later developed. The keywords may be associated with the entire content item, a portion of the content item, a field of the content item, etc. In the user model, the keywords may be associated with a salience score. At block 1015 an action may be performed on the content item based on the salience score alone or based on the salience score in combination, for example, with the keywords or other salience scores. Any type of action may be performed, for example, the content item may be sorted, filtered, moved, deleted, flagged, highlighted, re-tweeted, replied to, forwarded, prioritized, etc. Moreover, a portion of a content item or a document may be highlighted or flagged based on the salience score alone or based on the salience score in combination, for example, with the keywords or other salience scores.

Highlighting of a content item may include any type of change in the content item, other content items, or the document that distinguishes the content item from other content items or indicates the significance of the content item. For example, highlighting may include circling the content item, bordering of all or portions of the content item, flashing of all or portions of the content item, changing the color of all or portions of the content item, changing the brightness of all or portions of the content item, changing the contrast of all or portions of the content item, changing of all or portions of the content item look like it has been marked with a highlighter, fading out of all or portions of content items that are not being highlighted, changing the volume of portions of the content item, starting a time-based content item (e.g., a video, or audio) at a different place in time, outlining all or portions of the content item, etc.

For example, the content item may be an e-mail message. Keywords may be determined for the e-mail message based on the content of the e-mail message. These keywords may include the name of the sender, the name of the recipient, the subject, words in the subject field, keywords associated with content in the body or subject of the e-mail, topics in the subject, topics in the body of the e-mail, domain name of the sender, domain name of the recipient, etc. An action may then be performed based on the salience scores associated with the keyword(s). These actions may include any rule or action found in standard e-mail programs (e.g., the rules found in Microsoft Outlook), and may be based, at least in part, on the salience scores associated with the keyword(s). A couple more specific examples follow.

A user model may be used to filter content. For example, the user model may include a rule that e-mails, text messages, chat messages, or tweets from senders associated a high salience score are flagged as important. Moreover, the user model may indicate that messages received from a specific friend are associated with a high salience score. Thus, when an e-mail from the specific friend is received, the friend's name is identified as the sender of the e-mail and that the friend's name is associated with a high salience score (e.g., a salience score above a threshold value). The user model may, therefore, predict that the incoming email may have a high predicted salience score. The e-mail is therefore flagged as important based on the rule in the user model.

As another example, the user model may associate a low predicted salience score for e-mails from users at a specific domain, for example, users associated with spam or advertisements. The user model may also include a rule that e-mails from senders with a low predicted salience score are deleted. When an e-mail from a user at the specific domain is received, the domain name may be identified from the sender's e-mail address and that it is associated with a low predicted salience score (e.g., a salience score below a threshold value). The user model may, therefore, predict that the incoming email may have a low predicted salience score. The e-mail is therefore deleted as unimportant based on the predicted salience score of the sender being at the specific domain.

As another example, the user model may present specific portions of content (or content items within a document) to a user based on the salience of the various portions of the content. For instance, the user model may predict that a paragraph in an article may have a high predicted salience score based on the paragraph's keywords and the associated salience scores of keywords in the user model. This paragraph may be highlighted, selected or presented to the user based on this predicted salience score. The user model may predict that a scene within a video may have a high predicted salience score based on the keywords associated with the scene and the associated salience scores of keywords in the user model. The scene may be presented to the user instead of the entire video. Similarly, portions of music, music, text, images, advertisements, videos, pages within a book, images, podcasts, etc. may be presented, highlighted, or provided based on a predicted salience score.

As another example, a document with text and/or other content items and may be presented to a user. Keywords may be determined for portions of text within the document. For instance the document may include a number of sentences or paragraphs that may be associated with one or more keywords. The user model may predict that a paragraph and/or sentence in the document may have a high predicted salience score based on each paragraph's or sentence's keywords and the associated salience scores of keywords in the user model. These paragraphs and/or sentences with a high predicted salience score may be highlighted. Moreover, different paragraphs and/or sentences may be highlighted differently based on the associated predicted salience score. As one example, content items above a certain threshold may be highlighted, and, in another example, the intensity, brightness, color, etc. of the content items may vary based on the predicted salience score.

The user model may include any number of rules that filter, cluster, organize, or act on content based on the predicted salience of the content. The predicted salience of the content may be made based on the user model or other user models.

The embodiments described herein may include the use of a special purpose or general purpose computer including various computer hardware or software modules, as discussed in greater detail below.

Embodiments described herein including but not limited to the server discussed above may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of using a user model with salience, the method comprising:
   providing a content item to a user through a user interface;
   receiving physiological data corresponding to a physiological response of the user as the user interacts with the content item provided through the user interface;
   determining a salience score for the content item based at least in part on the physiological response of the user;
   updating a user model with the salience score for the content item;
   determining a salience ranking for one or more keywords of the content item based on the salience score for the content item;
   determining a relevance ranking for the one or more keywords of the content item based on the relevance of the one or more keywords to the content item; and
   updating the user model to include a combined score for the one or more keywords of the content item based on the salience ranking and the relevance ranking;
   wherein the salience ranking is at least partially based on the timing of determining the salience score for the content item.

2. The method according to claim 1, wherein the method further comprises receiving eye tracking data corresponding to a plurality of viewing angles of an eye of the user over time as the user interacts with the content item over time, wherein determining a salience score is based at least in part on the viewing angle data.

3. The method according to claim 1, wherein updating the user model with the salience score comprises associating the salience score with the content item within the user model.

4. The method according to claim 1, the method further comprising:
   determining one or more keywords from the content item; and
   associating the salience score with the one or more keywords within the user model.

5. The method according to claim 1, the method further comprising performing an action on a document based on the user model.

6. The method according to claim 1, the method further comprising recommending another content item to a user based on the user model.

7. The method according to claim 1, wherein the physiological data comprises brain activity data.

8. The method according to claim 1, the method further comprising:
   maintaining, at a server, an aggregate user model database having a plurality of user models associated with a plurality of users, each of the plurality of user models associated with a user and associated with a content item consumed by the user with a salience score of the user when viewing the content item;
   clustering, at the server, at least a first user model of the plurality of user models associated with a first user of the plurality of users and a second user model of the plurality of user models associated with a second user of the plurality of users based at least in part on the similarity of salience measures of a similar content item within the first user model and the second user model; and
   determining, at the sever, a recommended content item for the first user based at least in part on the salience measures of the recommended content item of the second user as indicated in the second user model.

9. The method according to claim 8, wherein each of the salience measures are based at least in part on either or both of a physiological response of the user as the user views at least a portion of the content item and eye tracking data as the user views at least a portion of the content item.

10. The method according to claim 8, wherein the plurality of user models ranks a plurality of content items based on a plurality of salience scores.

11. The method according to claim 8, wherein the recommended content item is selected from a list consisting of an advertisement, a video, music, a document, and a webpage.

12. The method according to claim 8, further comprising sending the recommended content item to the first user from the server.

13. The method according to claim 8, further comprising highlighting a portion of a document related to the recommended content item based at least in part on the salience measures of the recommended content item of the second user as indicated in the second user model.

14. The method according to claim 8, further comprising highlighting a portion of a document related to the recommended content item based at least in part on keywords associated with the recommended content item.

15. The method according to claim 8, further comprising at least one of:
   advancing to a specific portion of a video that is related to the recommended content item based at least in part on the salience measures of the recommended content item of the second user as indicated in the second user model;
   advancing to a specific portion of a video that is related to the recommended content item based at least in part on keywords associated with the recommended content item; and
   advancing to a specific portion of a video that is related to the recommended content item based at least in part on keywords associated with the recommended content item.

16. A system of associating salience with a content item, comprising:
   a user interface configured to present the content item to a user;
   a physiological sensor configured to record a physiological response of the user over time as the user interacts with the content item; and
   a controller communicatively coupled with the user interface and the physiological sensor, the controller configured to:
      provide the content item to the user interface for presentation to the user;
      associate the physiological response of the user with the content item as the user engages with the content item;
      determine a salience score for the content item based at least in part on the physiological response of the user;
      update a user model with the salience score for the content item;
      determine a salience ranking for one or more keywords of the content item based on the salience score for the content item;
      determine a relevance ranking for the one or more keywords of the content item based on the relevance of the one or more keywords to the content item; and update the user model to include a combined score for the one or more keywords of the content item based on the salience ranking and the relevance ranking;

wherein the salience ranking is at least partially based on the timing of determining the salience score for the content item.

17. The system according to claim 16, further comprising an eye tracking system configured to record eye tracking data that associates the viewing angle corresponding to a plurality of viewing angles of an eye of a user over time as the user interacts with the content item, and wherein the controller is configured to determine the salience score for the content item based at least in part on the eye tracking data.

18. The system according to claim 16, wherein the controller is further configured to:

determine one or more keywords from the content item; and associate the salience score with the one or more keywords within the user model.

19. The system according to claim 16, wherein the controller is further configured to perform an action on a document based on the user model.

20. The system according to claim 16, wherein the controller is further configured to recommend another content item to a user based on the user model.

* * * * *